United States Patent
Yang et al.

(10) Patent No.: US 9,904,976 B2
(45) Date of Patent: Feb. 27, 2018

(54) HIGH PERFORMANCE PORTABLE CONVULATIONAL NEURAL NETWORK LIBRARY ON GP-GPUS

(71) Applicant: NEC Laboratories America, Inc., Princeton, NJ (US)

(72) Inventors: Yi Yang, Plainsboro, NJ (US); Srimat Chakradhar, Manalapan, NJ (US)

(73) Assignee: NEC Corporation (JP)

( * ) Notice: Subject to any disclaimer, the term of this patent is extended or adjusted under 35 U.S.C. 154(b) by 190 days.

(21) Appl. No.: 14/945,548

(22) Filed: Nov. 19, 2015

(65) Prior Publication Data

US 2016/0210723 A1 Jul. 21, 2016

Related U.S. Application Data

(60) Provisional application No. 62/104,352, filed on Jan. 16, 2015.

(51) Int. Cl.
*G06T 1/20* (2006.01)
*G06T 1/60* (2006.01)
*G06N 3/00* (2006.01)

(52) U.S. Cl.
CPC ...... *G06T 1/20* (2013.01); *G06N 3/00* (2013.01)

(58) Field of Classification Search
CPC .................................. G06T 1/20; G06N 3/00
See application file for complete search history.

(56) References Cited

U.S. PATENT DOCUMENTS

| | | | | |
|---|---|---|---|---|
| 2012/0104232 A1* | 5/2012 | Hwang | ............ | H04N 5/23241 250/208.1 |
| 2013/0024412 A1* | 1/2013 | Gong | ...................... | G06N 5/00 706/46 |
| 2016/0162402 A1* | 6/2016 | Woolley, Jr. | ......... | G06N 3/0454 711/202 |

OTHER PUBLICATIONS

Chetlur et al, "cuDNN: Efficient Primitives for Deep Learning," 2014, arXiv preprint arXiv:1410.0759, 9 pages.*
Yangqing Jia et al, Caffe: Convolutional Architecture for Fast Feature Embedding at http://caffe.berkeleyvision.org/ Jan. 5, 2012.
Alex Krizhevsky el al, ImageNet Classification with Deep Convolutional Neural Networks, at image-net.org, Jan. 10, 2012.
NVIDIA cuDNN—GPU Accelerated Deep Learning at https://developer.nvidia.com/cuDNN, Oct. 15, 2015.

* cited by examiner

*Primary Examiner* — David F Dunphy
(74) *Attorney, Agent, or Firm* — Joseph Kolodka

(57) ABSTRACT

Systems and methods are disclosed for speeding up a computer having a graphics processing unit (GPU) and a general purpose processor (GP-GPU) by decoupling a convolution process for a first matrix into a row part and a column part; expanding the row part into a second matrix; performing matrix multiplication using the second matrix and a filter matrix; and performing reduction on an output matrix.

18 Claims, 4 Drawing Sheets

```
Step 1: matrix expansion
for (ni: NUM_IM; i: IN_F; iy: IM_SZ; ix: IM_SZ;
  fx: F_SZ)
  in_tmp[fx][i][iy][ix][ni] = in[i][iy][ix+fx][ni];
Step 2: matrix multiplication
for (o: OUT_F; ni: NUM_IM; i: IN_F; iy: IM_SZ;
ix: IM_SZ; fy: F_SZ; fx: F_SZ)
  out_tmp[o][fy][iy][ix][ni] +=
    in_tmp[fx][i][iy][ix][ni]*filter[o][fy][fx][i];
Step 2: matrix reduction
for (o: OUT_F: ni: NUM_IM; i: IN_F; iy: IM_SZ;
  ix: IM_SZ; fy: F_SZ)
  out[o][iy][ix][ni] = out_tmp[o][fy][iy+fy][ix][ni];
```

```
for (int o=0; o<OUT_F; o++) // number of output features
for (int ni=0; ni<NUM_IM; ni++) // number of images
for (int i=0; i<IN_F; i++)   // number of input feature
for (int iy=0; iy<IM_SZ; iy++) // y size of input image
for (int ix=0; ix<IM_SZ; ix++)// x size of input image
for (int fy=0; fy<F_SZ; fy++) // y size of filter
for (int fx=0; fx<F_SZ; fx++) // x size of filter
        out[o][iy][ix][ni] +=
            in[i][iy+fy][ix+fx][ni]*filter[o][fy][fx][i];
``` a) Original FData Process

```
for (o: OUT_F; ni: NUM_IM; i: IN_F; iy: IM_SZ;
   ix: IM_SZ; fy: F_SZ; fx: F_SZ)
   in[i][iy][ix][ni] +=
        out[o][iy-fy][ix-fx][ni]*filter[o][fy][fx][i];
``` b) BData Process with simplified loop description

```
for (o: OUT_F; ni: NUM_IM; i: IN_F; iy: IM_SZ;
   ix: IM_SZ; fy: F_SZ; fx: F_SZ)
   filter[o][fy][fx][i] +=
        out[o][iy][ix][ni]*in[i][iy+fy][ix+fx][ni];
``` c) BGrad Process with simplified loop description

FIG. 1 (PRIOR ART)

```
Step 1: matrix expansion
for (ni: NUM_IM; i: IN_F; iy: IM_SZ; ix: IM_SZ;
   fx: F_SZ)
   in_tmp[fx][i][iy][ix][ni] = in[i][iy][ix+fx][ni];
Step 2: matrix multiplication
for (o: OUT_F; ni: NUM_IM; i: IN_F; iy: IM_SZ;
ix: IM_SZ; fy: F_SZ; fx: F_SZ)
   out_tmp[o][fy][iy][ix][ni] +=
      in_tmp[fx][i][iy][ix][ni]*filter[o][fy][fx][i];
Step 2: matrix reduction
for (o: OUT_F; ni: NUM_IM; i: IN_F; iy: IM_SZ;
   ix: IM_SZ;  fy: F_SZ)
   out[o][ iy][ix][ni] = out_tmp[o][fy][ iy+fy][ix][ni];
```

FIG. 2

HIGH PERFORMANCE PORTABLE CONVULATIONAL NEURAL NETWORK LIBRARY ON GP-GPUS

This application claims priority to Provisional Application Ser. No. 62/104352 filed 2015 Jan. 16, the content of which is incorporated by reference.

BACKGROUND

This invention relates to high performance portable convolutional neural network library on GP-GPUs.

GPU-based clusters are increasingly being deployed in workstations or in HPC environments to accelerate a variety of software applications. GPU-accelerated computing is the use of a graphics processing unit (GPU) together with a general purpose processor (GP-GPU) to accelerate scientific, analytics, engineering, consumer, and enterprise applications. GPU accelerators now power energy-efficient datacenters in government labs, universities, enterprises, and small-and-medium businesses around the world. GPUs are accelerating applications in platforms ranging from cars, to mobile phones and tablets, to drones and robots.

GP-GPU-accelerated computing offers unprecedented application performance by offloading compute-intensive portions of the application to the GPU, while the remainder of the code still runs on the general purpose CPU. From a user's perspective, applications simply run significantly faster. A simple way to understand the difference between a CPU and GPU is to compare how they process tasks. A CPU consists of a few cores optimized for sequential serial processing while a GPU has a massively parallel architecture consisting of thousands of smaller, more efficient cores designed for handling multiple tasks simultaneously.

Coprocessor-based clusters are those whose nodes have many-core-based coprocessors such as the NVIDIA Graphical Processing Unit (GPU) or the Intel Many Integrated Core (MIC). The coprocessor itself can be a generic concept, not necessarily a "multicore"/"manycore" processor but any processing element that can execute portions of the computation. Such a "coprocessor" can be an FPGA (specialized/customizable computation unit), a standalone processor like IBM Cell, a GPU, a Intel MIC, or any other many core processors. The coprocessor may or may not be connected by a PCI bus; instead, it can be connected by many different types of interconnect. For example, the coprocessor can be on the same chip as the main CPU (such as the AMD Fusion or IBM Cell), or connected by a bus (PCI/PCIe bus).

SUMMARY

In one aspect, systems and methods are disclosed for speeding up a computer having a graphics processing unit (GPU) and a general purpose processor (GP-GPU) by decoupling a convolution process for a first matrix into a row part and a column part; expanding the row part into a second matrix; performing matrix multiplication using the second matrix and a filter matrix; and performing reduction on an output matrix.

In another aspect, a library based on matrix multiplication is provided to leverage existing libraries such as CUBLAS for convolutional neural network on GPGPUs. The library provides both high performance and portability.

In yet another aspect, the system solves the convolution problem using a three-step approach. The first step is to perform matrix expansion, the second step is to use matrix multiplication, and the last step is to perform matrix reduction.

Advantages may include one or more of the following. Our approach has good portability as we are using CUBLAS for matrix multiplication to achieve high performance. Our approach has low overhead compared to Caffe as our three-step approach can reduce the memory usage significantly. The system achieves: low overhead, high performance and good portability. The library can be used as a performance and productivity tool for Intel Xeon Phi coprocessor in HPC servers. The system can be used as a software platform for the image recognition of media analytic group or integrated into a machine learning group.

BRIEF DESCRIPTION OF THE FIGURES

FIG. 1 shows an exemplary process requiring matrix multiplication and a convolution.

FIG. 2 shows an exemplary process for configuring a graphics-processing unit (GPU) in a computer system in accordance with the disclosed embodiments.

In the figures, like reference numerals refer to the same figure elements.

DETAILED DESCRIPTION

Figure 3:
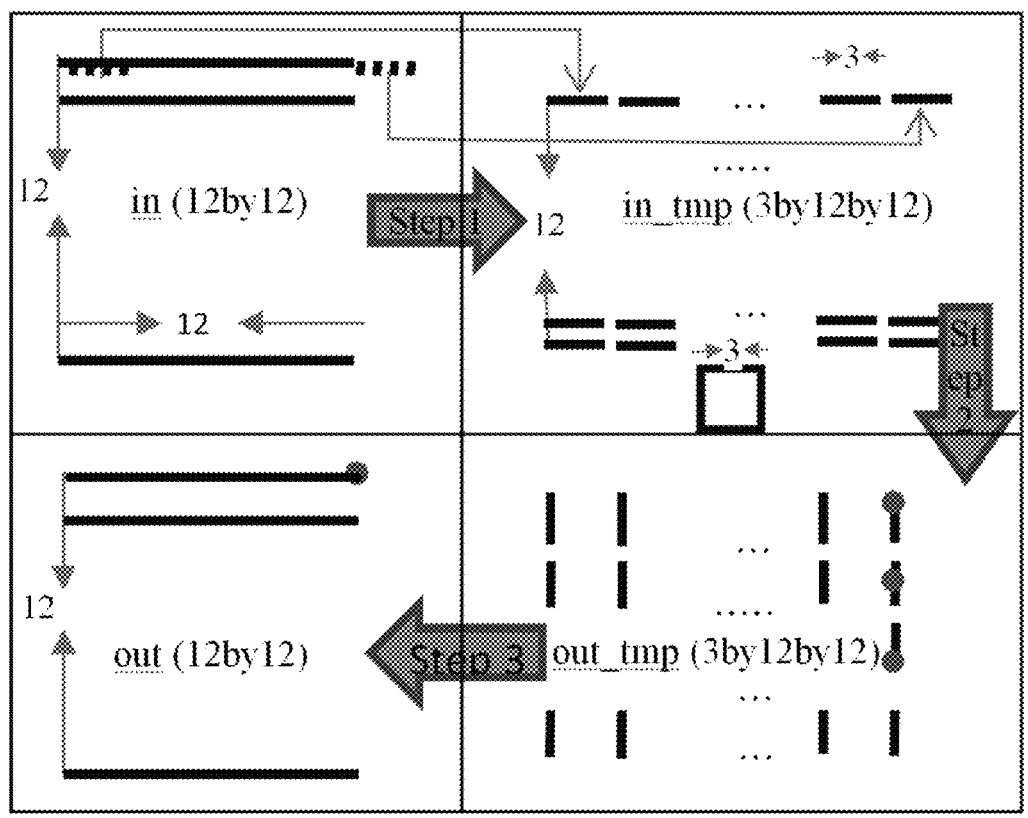
FIG. 3 shows an example whose input size is 12×12 and filter size is 3×3.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The disclosed embodiments provide a method and system for configuring a graphics-processing unit (GPU) in a computer system. The computer system may correspond to a portable electronic device, laptop computer, personal computer, workstation, media player, and/or another electronic device capable of driving a display. The GPU may be a high-power, discrete GPU that is connected to a motherboard in the computer system through an interface such as Peripheral Component Interconnect Express (PCIe). Conversely, the GPU may be a low-power, embedded GPU that is integrated into the motherboard of the computer system.

The system provides a module that enables high computer performance. An exemplary problem to be solved is presented in FIG. 1, and solution that speeds up solution for FIG. 1 uses three-step convolutional kernels on GP-GPUs based on matrix multiplication.

FIG. 1 shows an exemplary method that needs speeding up a computer. This is done through a matrix multiplication and a convolution process. We decouple the convolution process which is 2D into a row part and a column part. We expand the row part of the convolution process into a larger matrix. Then we perform matrix multiplication using the larger matrix and the filter matrix. Finally, we perform reduction on the output matrix to generate the final output matrix. Since the major execution of our approach is based on matrix multiplication, we can use CUBLAS, a high optimized library by Nvidia to achieve the high performance. Our library can also achieve the high performance on different generations of GPUs, as the CUBLAS is optimized for different GPUs. In FIG. 2, we show our proposed three-step process. FIG. 3 shows an example whose input size is 12×12 and filter size is 3×3.

Referring now to FIG. 2, a high performance portable convolutional neural network library is illustratively depicted. The library includes a three step implementation for a forward pass portion of a convolutional neural network (CNN).

The implementation includes a first step "STEP 1" in which an input image in( ) is expanded into a temporary input matrix in_temp( ). The input image in( ) includes a matrix of a size corresponding to a size of the input image (for example, a 12 by 12 matrix). The input image in( ) may also be of more than two dimension, such as, e.g., 3 dimension, whereby the first dimension may correspond to the number of features of a pixel, the second dimension may correspond to the y dimension, and the third dimension may correspond to the x dimension.

The input image in( ) may be expanded at the first step "STEP 1" by combining the input image in( ) with a filter matrix in_f( ). To perform this combination, input image blocks are generated from the input image in( ) corresponding to each pixel of the input image in( ). The input image blocks may include a matrix of a size that is the same as the filter matrix in_f( ). In order to combine the filter matrix in_f( ) with the input image in( ), the input image blocks and the filter matrix in_f( ) are each decoupled into row vectors, and a row-wise dot product is summed between the input image blocks and the filter matrix in_f( ) and inserted into the temporary input matrix in_temp( ). The temporary input matrix in_temp( ), therefore, has an additional dimensions compared to the matrix of the input image in( ).

The implementation further includes a second step "STEP 2" in which matrix multiplication is performed by multiplying the temporary input matrix in_temp( ) by the filter matrix in_f( ) to generate a temporary output matrix out_temp( ). The temporary output matrix out_temp( ) is of a same size and dimensions as the temporary input matrix in_temp( ) except that the matrix multiplication results in the first dimension being oriented in a column direction as opposed to the rows of the temporary input matrix in_temp( ).

The implementation may further include a third step "STEP 3" in which a matrix reduction is performed on the temporary output matrix out_temp( ). In order to match the effect of a dot product between the filter matrix and an image block of the input image, each element in the column of the first dimension is added together to result in a single value. Thus, the matrix reduction effectively reduces the number of dimensions of the temporary output matrix out_temp( ). This step results in an output that matches the convolution step of past techniques. Upon this matrix reduction, a two dimensional output matrix out( ) corresponding to an output image is generated.

For a backward pass portion, these three steps may be reversed in order to determine loss gradients for optimization.

(i) Step 1: matrix expansion. For an input matrix, we expand each pixel of the matrix to a vector whose size is the size of x dimensions of the filter.

(ii) Step 2: matrix multiplication. We apply the matrix multiplication on the filter and the expanded matrix.

(iii) Step 3: For the output matrix in step 2, we apply reduction on pixels whose number is the size of y dimensions the filter to generate one final pixel.

When a matrix whose size is M×K and another matrix whose size is K×N, we explore the parallelism in B dimension to achieve high performance. We partition it into a number of small matrix multiplications. Let us say the number of small matrix multiplications is P. Then each small matrix multiplication has the size M×K/P with K/P×N without decreasing the values of M and N.

For CNNs, we find that a kernel with a single input size will be executed in thousand to million times. Since for an input size, single runtime profiling is enough to predict the best implementation for it, the cost of runtime profiling is very minor compared to the million times execution. As a result, we develop a runtime auto-tuning to find the best implementation for a specific input.

Our three-step implementation of convolutional kernel on GPGPUs offers the following advantages (i) The memory cost of our approach is only X times of input and output array, where X is the size of filter.

(ii) The matrix multiplication in our approach from a matrix whose size is X×Y×Y and another matrix whose size is X×X, where X is the filter size and Y is the input matrix size.

We utilize the nested parallelism to improve matrix multiplication. When a matrix whose size is M×K and another matrix whose size is K×N, we explore the parallelism in B dimension to achieve high performance.

We utilize auto-tuning to use existing implementation for convolutional neural network. For CNNs, a kernel with a single input size will be executed in thousand to million times, we develop a runtime auto-tuning to find the best implementation for a specific input.

Our solution can work on different generations of GPGPGUs, or even CPU and Intel MIC, as we are based on matrix multiplication for high performance. We can use existing Nvidia CUBLAS and Intel MKL for the matrix multiplication. Our memory transformation overhead is much less than conventional solutions such as Caffe. We are using three-step approach while Caffe is using two steps. If the filter size is X, then it requires X*X times memory space of the input image. We only need X times memory space of the input image and X times memory space of the output image. Therefore if the input image and output image are the same, the memory usage of our approach is only 2/X of the memory usage in Caffe, where X is always more than 3. Furthermore, the matrix multiplication in our approach has balanced different dimensions to achieve the better performance when using CUBLAS.

The system achieves: low overhead, high performance and good portability. The library can be used as a performance and productivity tool for Intel Xeon Phi coprocessor in HPC servers. The system can be used as a software platform for the image recognition of media analytic group or integrated into a machine learning group.

Figure 4:
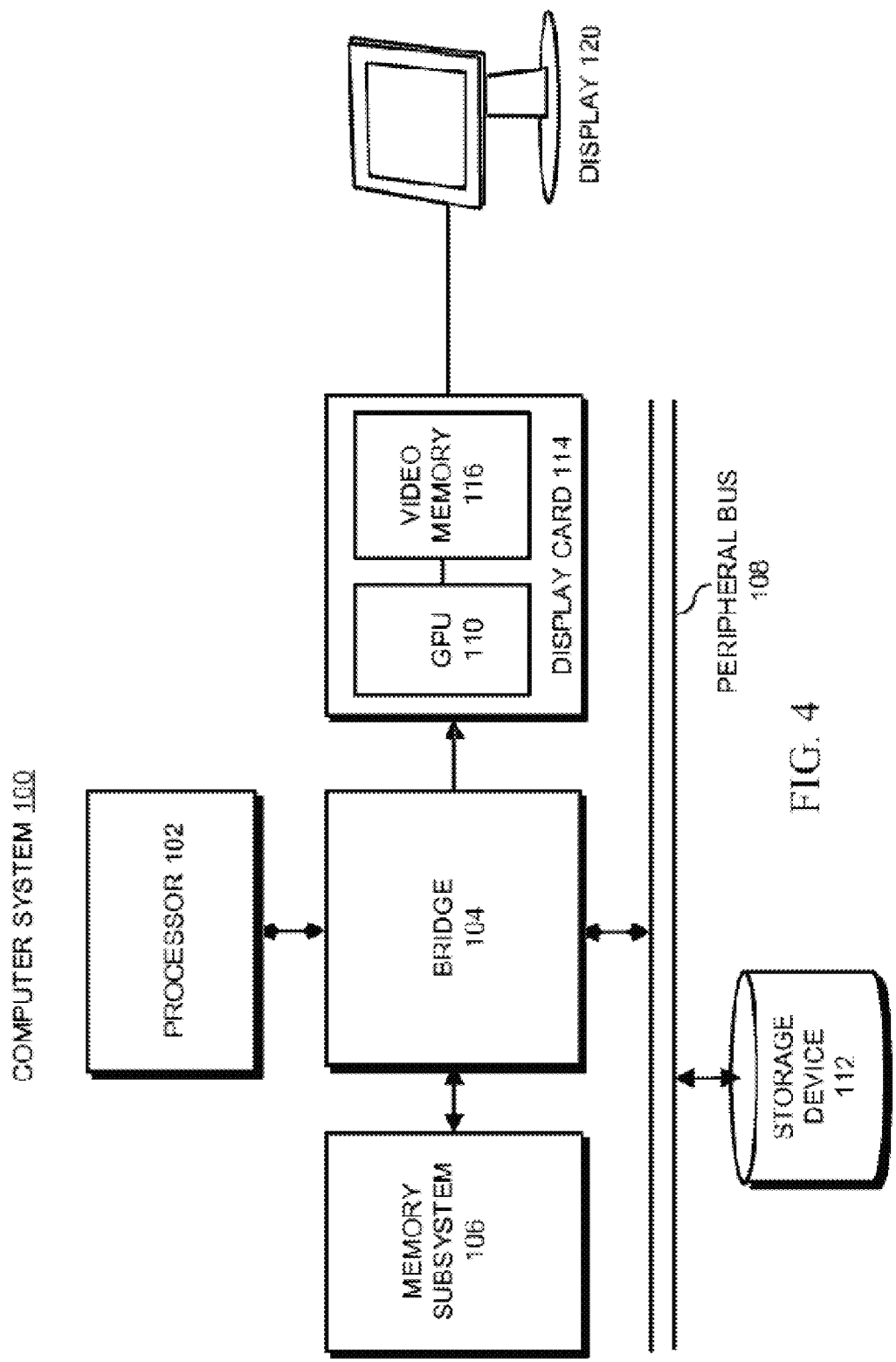
FIG. 4 shows an exemplary GPU enabled computer system in accordance with the disclosed embodiments.

FIG. 4 shows a computer system 100 in accordance with the disclosed embodiments. Computer system 100 may correspond to a personal computer, laptop computer, portable electronic device, workstation, and/or other electronic device capable of driving a display 120. As shown in FIG. 1, computer system 100 includes a processor 102 that is coupled through a bridge chip 104 to a memory subsystem 106 containing semiconductor memory. Processor 102 may also communicate with a storage device 112 containing non-volatile storage through a peripheral bus 108 coupled to bridge chip 104. For example, storage device 112 may be a disk drive containing non-volatile magnetic storage.

In addition, processor 102 may communicate with display 120 using a display card 114. More specifically, processor 102 is coupled to display card 114 through bridge chip 104. Display card 114 includes a graphics-processing unit (GPU) 110 that performs various graphical processing operations to produce video frames in one or more framebuffers located in video memory 116. The video frames may then be used to produce video streams that drive display 120. For example, the video streams may be transmitted over a standardized video interface such as Digital Visual Interface (DVI) or High-Definition Multimedia Interface (HDMI) to drive an external display (e.g., cathode ray tube (CRT) display, liquid crystal display (LCD), plasma display, organic light-emitting diode (OLED) display, surface-conducting electron-emitter display (SED), etc.) connected to computer system 100.

Those skilled in the art will appreciate that the workload of GPU 110 may fluctuate over time. For example, the workload of GPU 110 may be proportional to the number and/or complexity of graphics calls made to GPU 110 by applications on computer system 100. To facilitate workload processing by GPU 110, the operating level (e.g., operating voltage, operating frequency, etc.) of GPU 110 may be modified in response to changes in the workload of GPU 110.

For example, computer system 100 may periodically and/or continuously sample the workload of GPU 110 during execution of GPU 110. If the sampled workload has increased, computer system 100 may increase the operating level of GPU 110. On the other hand, if the sampled workload has decreased, computer system 100 may decrease the operating level of GPU 110.

However, such sampling-based power management of GPU 110 may prevent computer system 100 from responding to rapid fluctuations in the workload of GPU 110. For example, computer system 100 may sample GPU 110 over a span of 100 milliseconds and finish modifying the operating level of GPU 110 several milliseconds after the workload of GPU 110 has been sampled. As a result, adjustments to the operating level of GPU 110 may be made over 100 milliseconds after changes to the workload of GPU 110 have occurred.

In turn, the delay in the responsiveness of GPU 110 to changes in workload may cause the GPU's operating voltage and/or frequency to be out of sync with rapid and/or frequent workload fluctuations. For example, short, "bursty" workloads that occur every 100-200 milliseconds may cause GPU 110 to be at a low operating level when a workload is to be processed and at a high operating level when no workload is to be processed. Similarly, the sampled workload of GPU 110 may be based on the workload for one application and/or process, causing the operating level of GPU 110 to be adjusted too low if multiple workloads are received at around the same time from multiple applications and/or processes.

In one or more embodiments, computer system 100 facilitates the processing of workloads by GPU 110 by predicting an incoming workload to GPU 110 and configuring the subsequent execution of GPU 110 based on the incoming workload. The incoming workload may be predicted based on command buffers, graphics calls, applications, and/or APIs associated with GPU 110. Furthermore, the incoming workload may reflect the cumulative workload from multiple applications and/or processes instead of the workload for a single application and/or process. Next, an operational floor for GPU 110 may be identified based on the incoming workload. The operational floor may be associated with the operating voltage, operating frequency, memory bandwidth, latency, power-gating configuration, cache configuration, and/or throughput of GPU 110.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method for speeding up a computer having a graphics processing unit (GPU) and a general purpose processor (GP-GPU), comprising:
   decoupling a filter for a first matrix into a row part and a column part;
   expanding the first matrix to create a second matrix and inserting the row part into the second matrix;
   performing matrix multiplication using the second matrix and a filter matrix using the GPU; and
   reducing the size of an output matrix.

2. The method of claim 1, comprising using an optimized matrix multiplication.

3. The method of claim 1, comprising perfomiing matrix expansion.

4. The method of claim 1, comprising for an input matrix, expanding each pixel of the matrix to a vector whose size is the size of x dimensions of the filter.

5. The method of claim 1, comprising applying a matrix multiplication on the filter matrix and the second matrix.

6. The method of claim 1, comprising applying a reduction on pixels whose number is the size of y dimensions the filter to generate one final pixel.

7. The method of claim 1, for a matrix whose size is M×K and another matrix whose size is K×N, comprising exploring parallelism in B dimension.

8. The method of claim 1, comprising partitioning the matrix into a number of small matrix multiplications.

9. The method of claim 8, comprising wherein the number of small matrix multiplications is P. Then each small matrix multiplication has the size M×K/P with K/P×N without decreasing the values of M and N.

10. The method of claim 1, comprising providing runtime auto-tuning for a specific input.

11. The method of claim 1, comprising runtime profiling to predict implementation performance.

12. The method of claim 1, comprising applying nested parallelism to improve matrix multiplication.

13. The method of claim 1, for a matrix whose size is M×K and another matrix whose size is K×N, comprising applying parallelism in B dimension.

14. The method of claim 1, wherein the second matrix larger than the first matrix.

15. A computer system, comprising:
   a graphics processing unit (GPU) and a general purpose processor (GP-GPU);
   code for decoupling a filter for a first matrix into a row part and a column part;
   code for first matrix to create a second matrix and inserting the row part into the second matrix;
   code for perfoiiiiing matrix multiplication using the second matrix and a filter matrix using the GPU; and
   code for reducing the size of an output matrix.

16. The system of claim 15, comprising code for using an optimized matrix multiplication.

17. The system of claim 15, comprising code for performing matrix expansion.

18. The system of claim 17, comprising code for expanding each pixel of the matrix to a vector whose size is the size of x dimensions of the filter.

* * * * *